Oct. 21, 1924.
C. C. WORTHINGTON
1,512,439
MOTOR DRIVEN GANG LAWN MOWER
Filed May 19, 1917 4 Sheets-Sheet 1
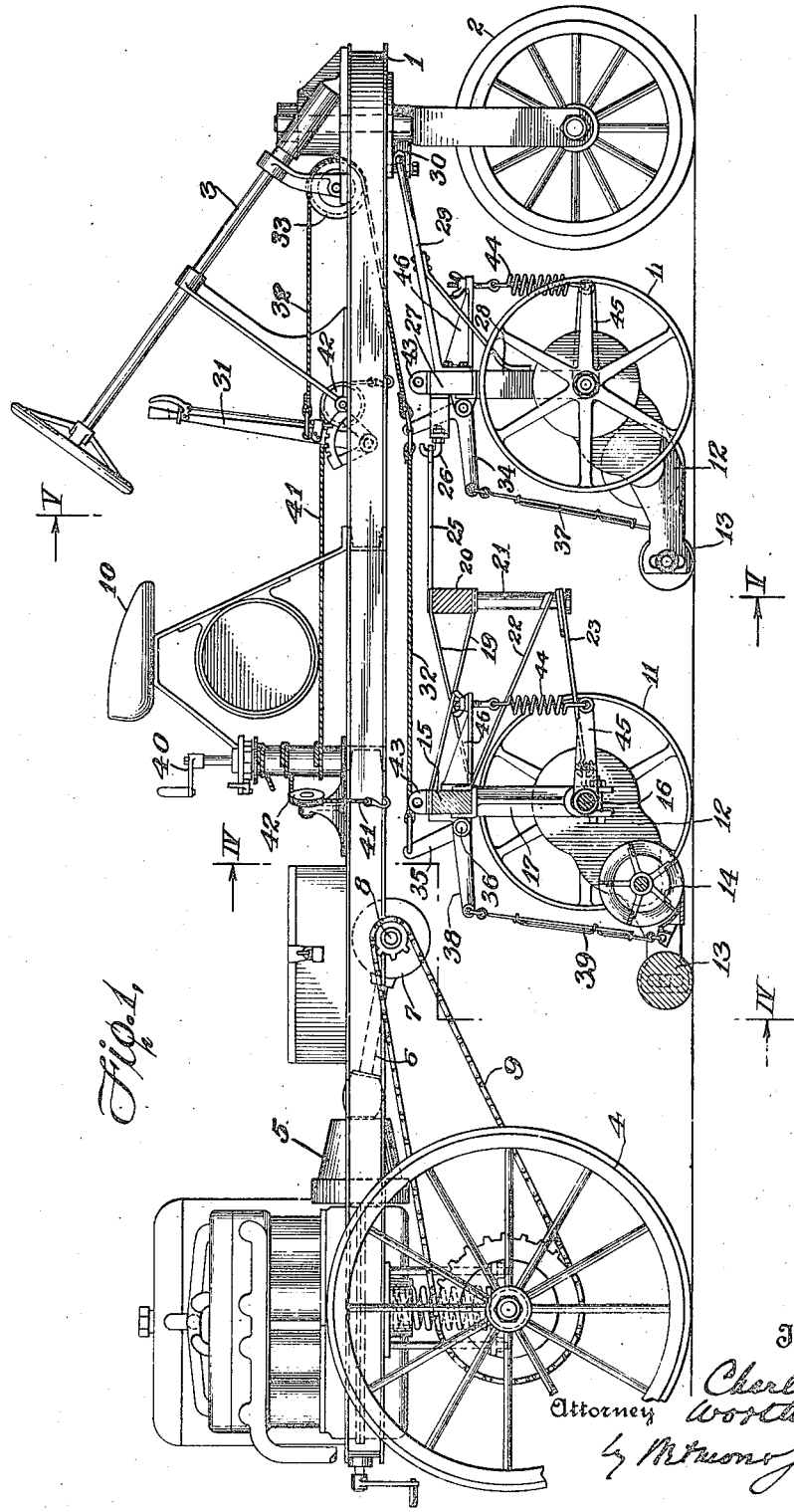

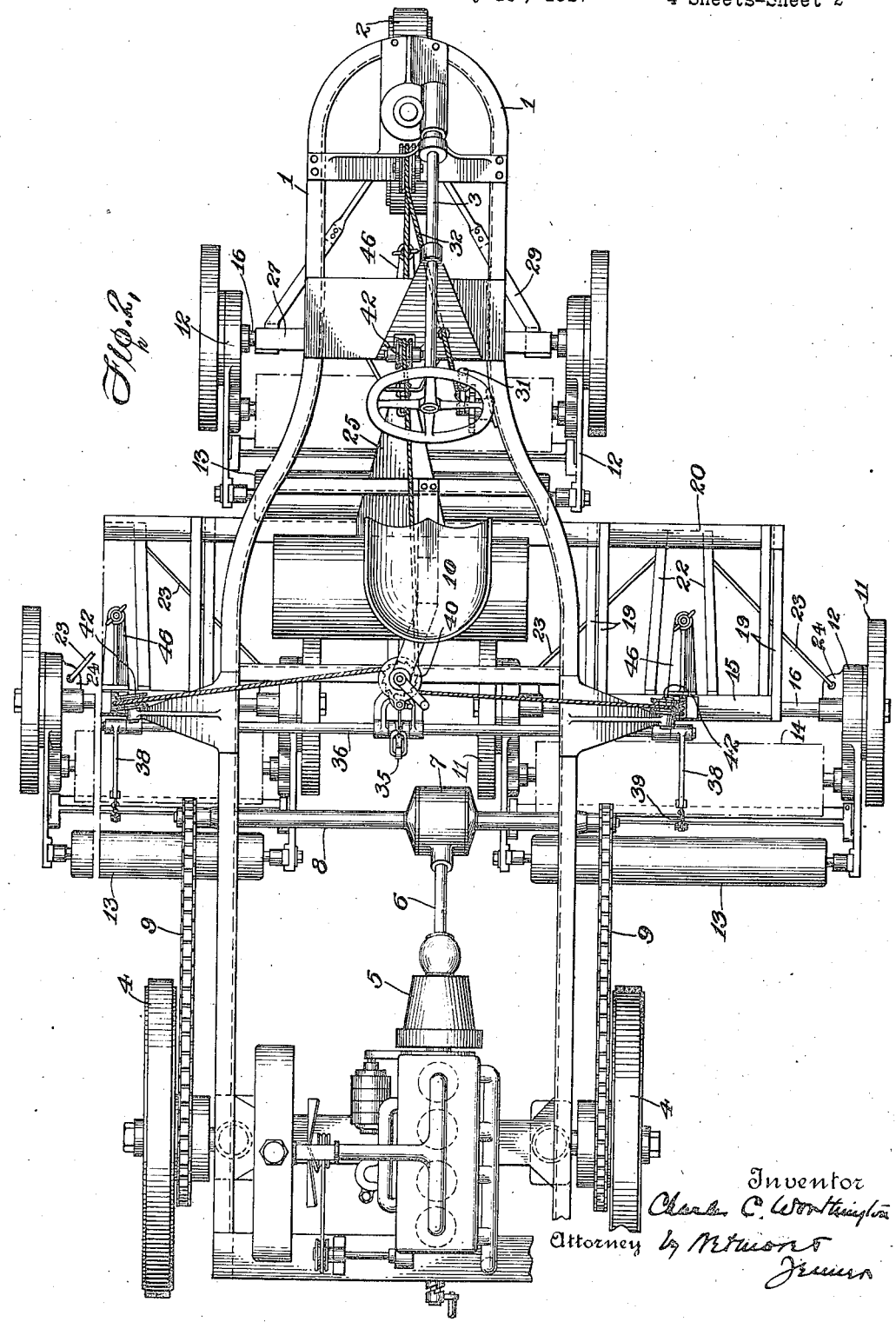

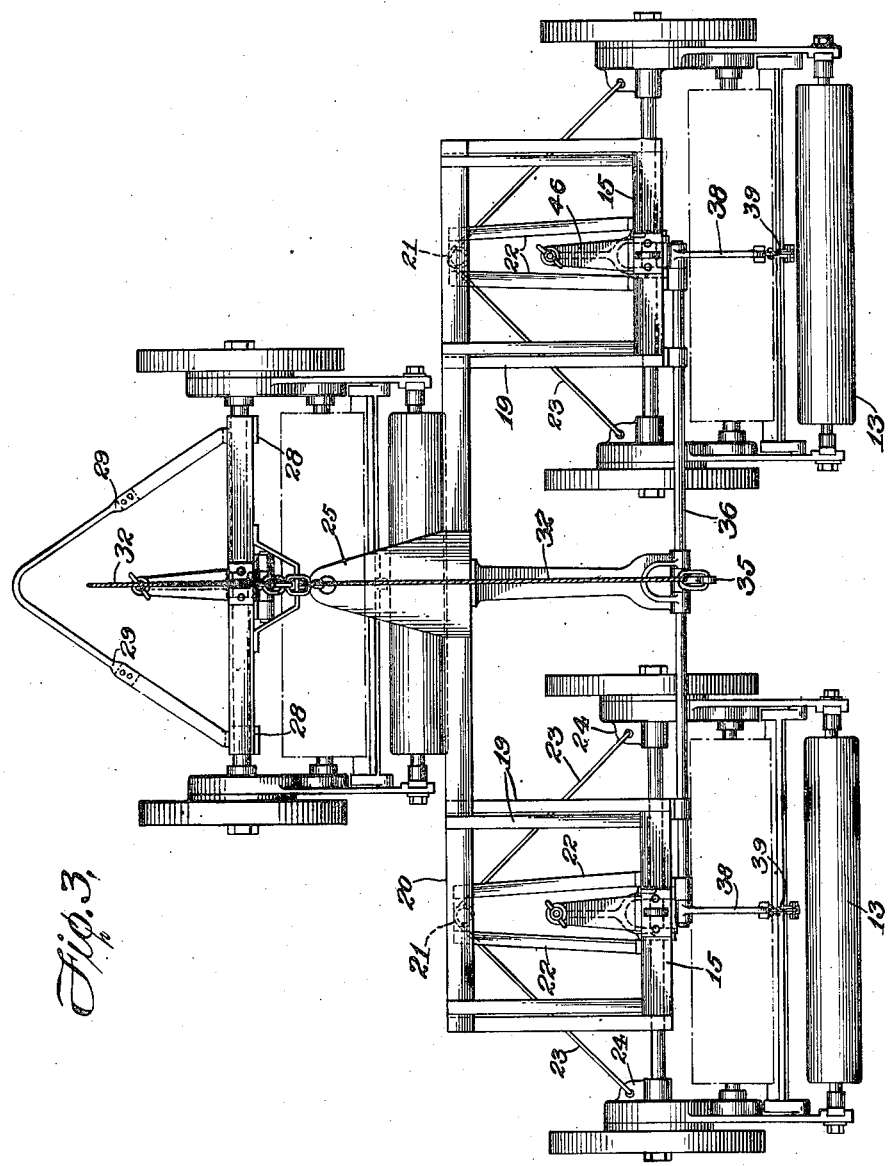

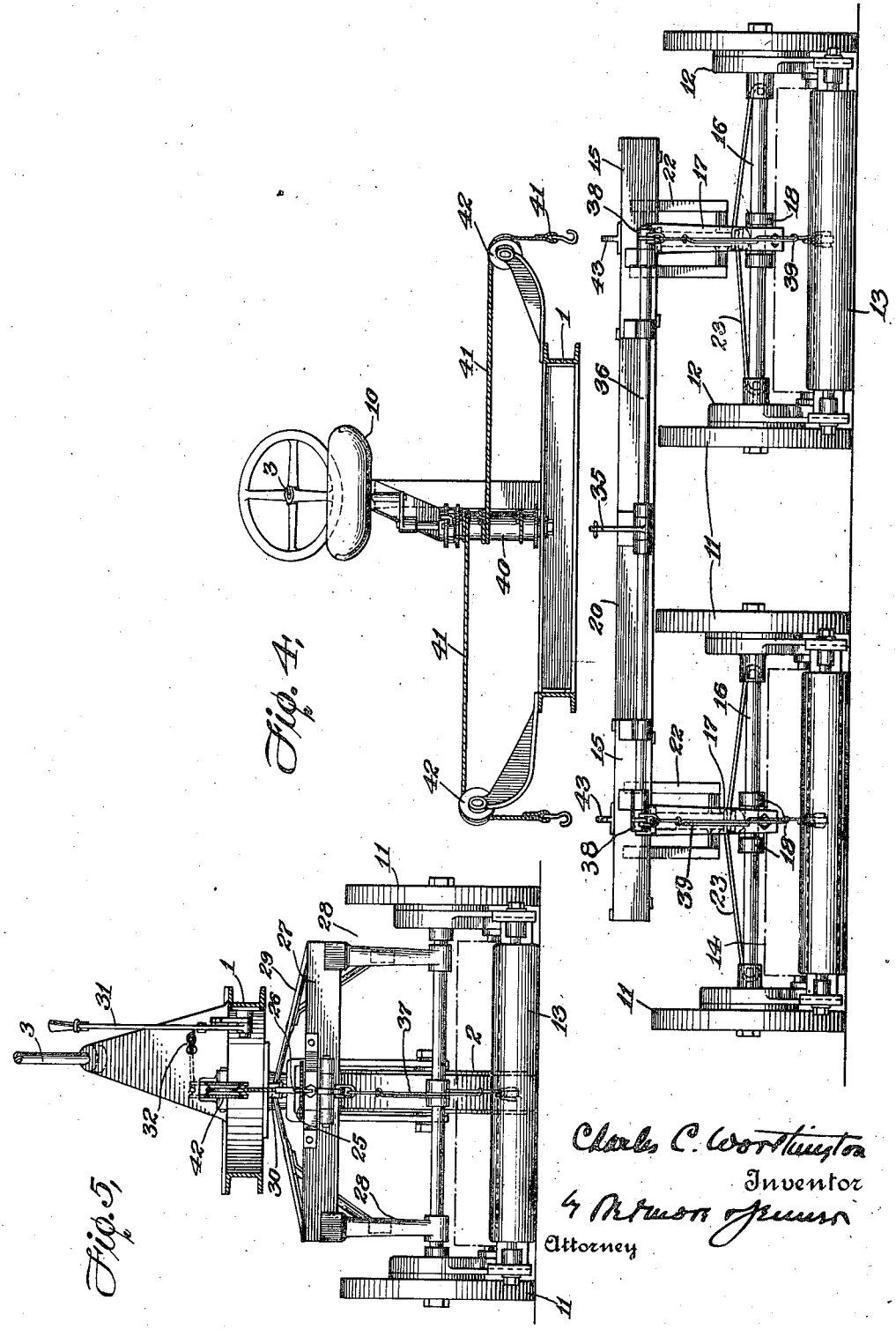

Patented Oct. 21, 1924.

1,512,439

UNITED STATES PATENT OFFICE.

CHARLES C. WORTHINGTON, OF DUNNFIELD, NEW JERSEY, ASSIGNOR, BY MESNE ASSIGNMENTS, TO WORTHINGTON MOWER COMPANY, OF SHAWNEE-ON-DELAWARE, PENNSYLVANIA, A CORPORATION OF DELAWARE.

MOTOR-DRIVEN GANG LAWN MOWER.

Application filed May 19, 1917. Serial No. 169,629.

*To all whom it may concern:*

Be it known that I, CHARLES C. WORTHINGTON, a United States citizen, residing in Dunnfield, New Jersey, have invented the following described Improvements in Motor-Driven Gang Lawn Mowers.

The invention is an improved motor lawn mower and comprises a self-impelled vehicle including a suitable power plant and an organization of lawn mower units so disposed as to cut a wide swath, substantially equal to the aggregate of their individual swaths and to be independently free to accommodate the undulations of the ground or surface to be mowed, the said mower organization being supported by the cutter-driving ground wheels of its several lawn mower units and independently of the vehicle which runs on wheels of its own. The invention also involves the organization of a self-impelled vehicle frame and a gang of lawn mower units in such manner as to enable the same to be lifted bodily from the ground and suspended from the vehicle whenever it is desired. Various other and supplemental and incidental features are also involved in the present invention, all of which will be made apparent in the following description and claims.

In the accompanying drawings:

Fig. 1 is a side elevation with parts in section of a three gang machine according to the present invention;

Fig. 2 is a top plan thereof with parts broken out for convenience;

Fig. 3 is a top plan of the gang frame and its units separated from the vehicle frame;

Fig. 4 is a rear view of Fig. 1 on the cross-section line IV—IV; and

Fig. 5 is a similar view on line V—V of Fig. 1.

The self-impelled vehicle comprises a vehicle frame 1 supported at its forward end upon a single wheel 2 provided with a steering column 3 whereby the vehicle may be guided by the operator. At its rear end the frame rests, by springs, upon the axle of two rear driving wheels 4 and an engine, gasoline or otherwise, is mounted directly above the rear axle and connected to drive the rear wheels through a transmission set 5, a propeller shaft 6, a differential 7, layshaft 8 and sprocket connection 9. These power plant parts may be constituted and arranged in any suitable way adapted for driving the vehicle and will be understood to include such controlling connections as may be necessary to enable the operator properly to run the vehicle from the seat 10.

The mowing machine is constituted by a gang of lawn mower units each comprising a pair of ground wheels 11, a unit frame 12, a wiper roller 13 and a rotary cutter 14 journalled in the unit frame and driven by one or both of the ground wheels 11 by means of gearing concealed in the sideplates of the unit frame. These units may be the same as common in ordinary hand lawn mowers. The frame of each unit is supported at its forward end on its ground wheels and at its rear end by the wiper roller 13 and is free to swing or oscillate vertically about the axes of the ground wheels as for example when the wiper roller rides over uneven ground. The several units of the gang are arranged in two ranks, in echelon formation, whereby those in the rear cut the strip of grass left between those in front and in the present case the gang is composed of three units in the said echelon formation, one being in front and two in rear, but it will be plain that the said formation may be accomplished by other arrangements and with various numbers of units.

The several units constituting the gang are held in their described arrangement by a frame and each is pivotally connected to the said frame so that it is free to tilt in a vertical transverse plane in both directions from horizontal independently of all the other units, in accommodating itself to ground undulations and moreover, all the units of the rear row can jointly tilt in a vertical transverse plane with respect to the unit or units in the front row whenever the ground surface requires such relative motion. The gang frame for this purpose comprises a cross bolster 15 directly above the axis or axle 16 of each rear unit and supported thereon by a forked post 17 which fits around the axle 16 between collars 18 thereon and so as to produce a pivotal or rocking joint between the units and the gang frame. The bolsters 15 are joined by forward braces 19 to the ends of a main cross-beam 20 and by oblique braces 22 to the lower ends of the posts 21 which depend from the lower sides of the said beam. The tension members or draft links 23 extending from the posts 21 to the lugs 24 on the unit frames serve to keep the units in vertical planes substantially parallel with the cross-beam 20 but do not interfere with the independent vertical tilting of the units. The cross-beam 20, as thus supported by the rear units, is connected by its central reach plate 25, to a hook 26 projecting from the bolster 27 of the front unit. This frame section of the front bolster, like the others, is directly over the axis or axle of the front unit and is shown in Fig. 5 as supported on that unit by posts 28 resting on or secured to the axle. These two forked posts 28, secured to the ends of the bolster 27, engage the axle or frame of the front unit near its ground wheels and serve to keep the front unit in a plane parallel with the bolster 27 under all conditions, being in this respect equivalent to the links 23 of the rear units. The particular style of joint for permitting the independent vertical tilting of the several lawn mower units, and the particular means for maintaining them in their proper vertical planes during such tilting are of no consequence whatever to the broad aspects of this invention and may be substituted by any design of structure that may be considered appropriate. The forward bolster 27 is connected by a tension draft-link or bar 29 to a perforated lug 30 on the forward part of the frame 1 of the self-impelled vehicle, whereby the gang of units may be drawn forwardly thereby. The said draw-bar link fits the perforated lug sufficiently loosely to constitute it as a flexible draft connection, permitting pivotal movement in different planes and the lug is made separable so that the draw-bar may be disconnected from it when desired. The hook 26 constitutes a universal joint, so that as the front unit is pulled around curves, following the steered wheel 2 of the vehicle, the front unit may oscillate vertically or in the vertical plane of its axle and the rear units follow it properly, turning in horizontal angles with reference to the vehicle and without gouging the lawn. By virtue of the described organization it will be noted that the gang framework and its connections which extend forwardly to the forward structure of the vehicle, constitute the means for spacing the several units and pulling them forwardly ahead of the motor-driven wheels and it will be apparent that each unit is capable of operating on ground at a different elevation from that on which the wheels of the vehicle may be resting at the moment or on which the other units may be mowing.

By connecting the gang of mower units to the steering end of the vehicle frame every slight change in direction of the course of the vehicle is immediately made effective in the course of the gang thereby enabling the operator to steer with the greatest accuracy.

The operator controls the several units from a single lever 31, which is connected to a cable 32 running to each of them. This cable is trained forwardly over a sheave 33, which is disposed immediately above the perforated draft lug 30 and then rearwardly to a bell-crank 34 on the bolster 27 of the front unit and thence rearwardly to a crank arm 35 on a rock shaft 36 spanning and journalled upon the two rear bolsters 15. The bell crank 34 is connected by a link 37 to the frame of the front unit, in rear of the cutter of that unit, and the arms 38 at the ends of the rock-shaft 36 are connected by links 39 with the frames of the rear units so that when the operator pulls the lever 31 all the cutters of the gang are raised from the ground. The lever 31 is provided with a latch and segment as indicated in Fig. 1, whereby the cutters may be held raised to any desired extent, such, for example, as may be suited for cutting the "low rough" of a golf course. The same lever may also serve to raise the cutters entirely out of operating relation, as will be apparent.

The cutters of all the units are normally urged toward the ground, against the forces tending to cause them to jump upwardly, by means of the adjustable springs 44 or by some other resilient force properly supplementing the gravity of the cutter mechanisms. The springs 44 are connected at their lower ends to crank-arms fixed to the unit frames 12 and extending forwardly therefrom as shown at 45. The upper ends of the springs are held by rigid bracket arms 46 projecting from the forward faces of the bolsters 15 and 27.

The gang of units organized as above described is disposed beneath that part of the structure of the motor vehicle which extends forwardly from the rear motor-driven wheels and also in the present case so that the axes of the rotary cutters are located between the axes of the front and rear vehicle wheels, and in any event so that the rear rank of units travels ahead of the rear vehicle wheels and in rear of the front steering means 2. Inasmuch as this steering means is a wheel and therefore has a relatively narrow tread surface as compared to the rollers commonly used on motor-lawn-mowers, and inasmuch as it is weighted with only the smaller part of the weight of the engine, it produces no objectionable rolling down effect on the grass ahead of the unit, or units, directly behind it, and at the same time has sufficient bearing on the ground for steering purposes. The operator's seat is situated directly over the ground area covered by the gang, in which position the operator can easily watch the units but is out of the way of the cut grass and dust which is thrown up by them.

By virtue of the described location of the units various other advantages are obtainable, among which is the ability to suspend the entire lawn mowing organization from the vehicle frame whenever desired, as for example when it is necessary to run the vehicle without mowing. For this purpose the vehicle frame is provided with a winch 40 and three cable lines 41 run therefrom, over appropriate sheaves 42, to three separated points above the gang frame. The hooks on the ends of these lines of cable are adapted for connection with corresponding eyes 43 on the sections of the gang frame. When the mower units are to be suspended from the vehicle frame, the operator runs the machine forwardly until the gang frame becomes substantially centralized under the vehicle frame, then he connects the hooks to the eyes 43 and winds up the winch. Thereby the entire assemblage of units is lifted from the ground, either partly or completely as desired, and the vehicle can then be run as rapidly as desired without operation of any of the lawn mower units.

It will be understood that the machine above described, although representing the preferred form of my invention at the present time, is merely exemplary of the principles of the invention and that various modifications, changes in the proportions and relative arrangements of the parts, reversals and substitutions may be made therein without departing from the invention as specified in the appended claims. For example, in place of the above described winch may be substituted any of the well known hoisting devices actuated by power derived from the motor engine, or otherwise, through the medium of gas or water under pressure.

The vehicle is preferably fitted with a single forward wheel as shown and above described. This arrangement allows a shorter wheel base to be used and a shorter flexible connection, between the vehicle frame and the gang frame, than if two forward wheels were employed. In the process of turning, the forward unit describes an arc around the vertical axis of the central wheel and can not at any point swing into contact with it. Should two forward wheels be employed the arc would carry the unit against one or the other of them when turning unless such unit is spaced farther back from said wheel which would thereby unduly increase the over-all length of the machine. The single front wheel produces the least rolling-down effect upon the grass ahead of the mowers and the driven wheels being in rear find the best traction upon the mowed lawn in rear of the mowers. The frame 1 it will be noted is substantially rigid and therefore maintains the front and rear wheels of the vehicle at a fixed distance from each other for all conditions of operation.

Claims:

1. A motor-driven lawn mower comprising the combination of a motor vehicle having a front wheel and a motor-driven rear wheel and a plurality of lawn mower units having rotary cutters and ground-engaging wheels pivotally connected in non-supporting relation to, and forwardly drawn by said vehicle in a transverse rank in rear of said front wheel and ahead of said motor-driven wheel.

2. In a motor-driven lawn mower, a motor vehicle, a gang of mower units having cutter-driving ground-wheels and connected with the vehicle by means permitting unit accommodation to ground undulations and means for supporting said units from said vehicle with their ground-wheels out of engagement with the ground.

3. In lawn-mowing apparatus comprising a gang of lawn mower units having rotary cutters and ground-wheels and a motor vehicle for advancing said units, the combination of means on the vehicle for lifting and supporting a unit with the ground-wheels of said unit out of engagement with the ground.

4. In lawn-mowing apparatus comprising a gang of lawn mower units having rotary cutters and ground-wheels, and a motor vehicle for advancing said units, the combination of a frame section connected to one of said lawn mower units and to said vehicle, and means whereby said frame section and its connected unit are adapted to be lifted and held in an elevated inoperative position on the vehicle.

5. In a motor-driven gang lawn mower, the combination with a gang of lawn mower units having ground-wheels and rotary cutters, and a motor vehicle, of a frame section for one of said units adapted to hold said unit in overlapping relation to the other units, means whereby said frame section and its unit are connected to the vehicle to be advanced thereby, and means on the vehicle for holding said frame section elevated with the ground-wheels of its unit out of engagement with the ground.

6. In a motor-driven gang lawn mower, the combination with a gang of units having ground-wheels and rotary cutters, a motor vehicle having a motor-driven wheel in rear of said cutters and a front steering wheel ahead of said cutters, means connecting said units to the vehicle adapted to pull the same forwardly in overlapping positions and permitting each unit to operate on ground of different elevations independently of the vehicle wheels, said means including a frame section connected to the vehicle by means permitting its weight to rest on one of the units during mowing and adapting the entire weight of said section to be borne by the vehicle when said unit is inoperative, and means on said frame section for holding the cutter of its unit in a position to make a high cut of the grass.

7. A motor vehicle having a main longitudinal frame supported on front and rear rolling members, a lawn-mowing gang consisting of a plurality of mower units arranged in front and rear rows, the said gang being connected to the said main frame in non-supporting relation thereto, by means enabling the said rows to assume independent horizontal angles with respect to and beneath said main frame and with respect to each other and means for simultaneously adjusting a plurality of said units to make a high cut of the grass.

8. A gang lawn mower comprising a propelling motor supported on front and rear wheels and overlapping lawn mower units having rotary cutter mechanisms with their journals located between the journals of said motor-supporting wheels and draft means for said units permitting each of them to accommodate different undulations and different elevations of ground surface independently of each other and of said motor-supporting wheels.

9. A motor-driven gang lawn mower comprising a motor vehicle having front and rear wheels, a frame, and a propelling motor supported thereon, front and rear ranks of lawn mower units having rotary cutter mechanisms and ground wheels all of the latter being independent of said vehicle wheels, said cutter mechanisms being located in overlapping positions with their several journals situated between the journals of the front and rear wheels of the vehicle and connected to the vehicle by unit spacing means permitting said units to tilt relatively in vertical transverse planes and including joint means permitting the rear units to turn in horizontal planes beneath the vehicle and adapting all of said units to operate independently on ground of different elevations.

10. A motor-driven gang lawn mower comprising in combination, a gang of lawn mower units having cutter-driving ground-wheels arranged in overlapping positions in front and rear ranks, a motor vehicle provided with a motor-driven wheel in rear of said gang and with a forward structure extending over said gang and supported independently thereof, means extending rearwardly from said forward structure to all of said units for pulling the latter forwardly as the vehicle advances and permitting said units to move angularly in vertical transverse planes with respect to each other and said motor-driven wheel, said means including a draft-link joint intervening between said structure and a unit in the rear rank permitting the latter unit to assume different horizontal and vertical angles with respect to the vehicle and said front rank.

11. A motor-driven gang lawn mower comprising in combination, a gang of lawn mower units having cutter-driving ground wheels and arranged in overlapping positions in front and rear ranks, a motor-vehicle having a motor-driven wheel in rear of the rear rank of said gang, a forwardly extending frame structure and a front vehicle steering wheel supporting said structure and located ahead of said rear rank, all said vehicle wheels being independent of said unit ground wheels, and connecting means between said structure and said units permitting angular horizontal movement to the units of the rear rank and individual angular movement to all the units of the gang in vertical transverse planes.

12. A motor-driven gang lawn mower comprising the combination of a motor vehicle having a front vehicle wheel mounted on a vertical journal for steering the vehicle, a rear motor-driven wheel, and a motor-supporting frame structure connecting said wheels, a central lawn mower unit having ground-engaging wheels and a rotary cutter mechanism, means connecting said central unit to said vehicle structure adjacent the steering journal of said front vehicle wheel adapted to permit said central unit to tilt in vertical transverse planes in reference to said journal, and to operate on ground of varying elevation with respect to said steering wheel and other lawn mower units having ground-wheels and cutter mechanisms held in overlapping relation to said central unit, and adapted to move angularly in vertical transverse and also in horizontal planes beneath and in reference to said frame structure, the rotary cutter mechanisms of all of said units being situated between the journals of the front and rear vehicle wheels.

13. A motor gang lawn mower comprising in combination, a motor vehicle comprising a front vehicle wheel adapted for steering the vehicle, rear driving wheels and a propelling motor having the greater part of its weight supported by the rear wheels, a plurality of lawn mower units each having ground wheels independent of said vehicle wheels arranged in front and rear ranks and connected to the forward part of said vehicle, the rear rank being in rear of said steering wheel and both ranks being ahead of said driving wheels, and draft means connecting said units to the vehicle permitting said units to tilt in vertical transverse planes and operate on ground of different elevation independently of each other and of said vehicle wheels.

14. A motor gang lawn mower comprising in combination, a motor vehicle comprising a front steering wheel, rear driving wheels and a propelling motor having the greater part of its weight imposed on the rear wheels, a plurality of lawn mower units each having ground wheels independent of said vehicle wheels and disposed in a rear rank in rear of said steering wheel and a front rank ahead of said driving wheel and draft means connecting said units to the vehicle permitting the units to move angularly in vertical transverse planes independently of each other, said draft means including joint means permitting the units in the rear rank to assume varying horizontal angles.

15. A motor gang lawn mower comprising in combination, a motor vehicle comprising front rolling means of relatively narrow tread surface, rear rolling means and a propelling motor supported on said means with the greater part of its weight borne by the rear rolling means, a plurality of lawn mower units each being of greater width than said tread surface and having ground wheels independent of said vehicle rolling means and arranged in a rear rank in rear of said front rolling means and a front rank ahead of said rear rolling means, and draft means between said units and the vehicle permitting each unit to move angularly in a vertical transverse plane independently of the vehicle and including joint means permitting a rear unit to move also in varying horizontal angles.

16. In a motor gang lawn mower, the combination of rear motor-driven and front steering wheels, a vehicle main frame supported on said wheels, a propelling motor carried on said frame, the greater part of the weight of said motor being imposed on the rear vehicle wheels, and a plurality of lawn mower units having cutter-mechanisms and supporting ground wheels all independent of said vehicle wheels and connected in non-supporting relation to the vehicle frame by means permitting angular movement of said cutter mechanisms in vertical transverse and horizontal planes with reference to said main frame and between the journals of said vehicle wheels.

17. A motor-driven gang lawn mower comprising a vehicle having a motor-driven wheel and a structure extending forwardly thereof, lawn mower units adapted to operate below the forward structure of the vehicle and in advance of said driven wheel, and disposed in front and rear ranks, draft link means pivotally connecting said front rank in non-supporting relation to said forward structure, and draft means comprising a universal joint intervening between the draft link means of said front rank and a unit in the rear rank permitting the latter to tilt independently in vertical transverse planes and to turn horizontally beneath said structure.

18. A motor-driven gang lawn mower comprising in combination, a gang of lawn mower units having rotary cutters and ground-wheels, a gang frame spacing and holding said units in overlapping positions and permitting independent angular movement of each unit in a transverse vertical plane, a motor vehicle provided with a motor-driven wheel in rear of said gang frame and with a structure located over said gang frame and supported independently thereof, and a flexible draft connection extending rearwardly from said vehicle structure to said gang frame and permitting the gang frame to assume different horizontal angles with respect to the vehicle.

19. A motor-driven gang lawn mower comprising in combination, a gang of lawn mower units having cutter-driving ground wheels and arranged in front and rear overlapping positions, a motor vehicle provided with a motor-driven wheel in rear of said gang and with a forward structure extending over said gang and supported independently thereof and means extending rearwardly from said forward structure to, and connecting with, the front parts of all of said units for pulling the same forwardly as the vehicle advances and adapted to permit independent angular movement of said units in vertical transverse planes with respect to the vehicle and each other, said means including a universal joint connection intervening between said independently supported frame structure and a rear unit, and an operator's seat on the vehicle frame directly above the ground area embraced by said gang of units.

20. A motor-driven gang lawn mower comprising in combination, a gang of lawn mower units having cutter-driving ground wheels and spaced in overlapping positions in front and rear ranks, a motor vehicle provided with a motor-driven wheel in rear of the rear rank and with a front steering wheel ahead of said rank and a frame structure connecting said wheels and supported thereby independently of said units, means extending rearwardly from said frame structure to, and connected with the several lawn mower units and adapted to pull said units forwardly in their said overlapping positions as the vehicle advances, and permitting said units to independently operate on different ground elevations and tilt in vertical transverse planes, and means extending beneath the vehicle frame structure common to a plurality of said units adapted for raising the cutter mechanisms thereof about the journals of their respective ground wheels.

21. A gang lawn mower comprising a propelling motor supported on front and rear wheels and overlapping lawn mower units having rotary cutter mechanisms all located and operating between the axes of said motor-supporting wheels and draft means for said units permitting each of them to accommodate different undulations and elevations of ground surface independently of each other and of said motor supporting wheels, said means including a cross bolster and means mounted on the latter and common to a plurality of units for lifting the cutter mechanisms thereof away from the ground.

22. A motor-driven gang lawn mower comprising in combination, a gang of lawn mower units having cutter-driving groundwheels and spaced in front and rear ranks in overlapping positions, a motor vehicle provided with a motor-driven wheel in rear of the rear rank and with a wheel ahead of said rank and a frame connecting said wheels and supported thereon independently of said unit ground wheels, means extending rearwardly from said frame and connected to all said units adapted to pull the same forwardly in their said spaced positions as the vehicle advances and permitting said units to operate independently on ground of different elevation from each other and from said vehicle front wheel, and means extending from a station on the vehicle frame structure to a plurality of the units adapted for swinging the cutter mechanisms thereof upwardly about the journals of their respective ground wheels.

23. A motor-driven gang mower consisting of a plurality of mowing units arranged in transverse rows in overlapping front and rear positions, each of said units having a rotary cutter journalled therein, a motor vehicle having a main longitudinally extending frame supported on a rear motor-driven wheel and on a front steering wheel, all said units being connected in non-supporting relation to the said main frame by forwardly-pulling draft means enabling the said rows to assume independent horizontal angles with respect to the said main longitudinal frame and maintaining all said cutters in operative position in rear of the horizontal axis of said steering wheel and in advance of the said motor-driven wheel.

24. A gang lawn mower comprising a propelling motor supported on front and rear wheels, overlapping lawn mower units having rotary cutters and ground wheels, all of said unit ground wheels being independent of all said motor-supporting wheels and located ahead of the rear motor-supporting wheels and draft means for said units including a frame section and means connecting a unit to said frame section adapted to permit angular transverse movement of said unit with respect to said section.

25. A gang lawn mower comprising a propelling motor and vehicle frame supported on front and rear wheels, overlapping lawn mower units having rotary cutters and ground wheels independent of all said motor-supporting wheels and located ahead of the rear motor-supporting wheels, draft means for said units including a frame section, means connecting said frame section to the vehicle frame adapted to permit vertical movement of said section with reference to the vehicle frame and means connecting a unit to said frame section adapted to permit angular transverse movement of the unit with reference to said frame section.

26. A motor-driven lawn mower, comprising the combination of a vehicle having a frame structure carried on front and rear wheels and carrying a motor to drive said rear wheel, a gang of lawn mower units arranged to operate in non-supporting relation to said vehicle ahead of the rear wheels thereof and comprised of front and rear ranks of mower units having ground-wheels, draft link means whereby said front rank is pulled forwardly by the vehicle and draft link means intervening between the rear rank and said vehicle, the latter means permitting angular movement of the rear units in vertical and horizontal planes beneath said vehicle frame structure.

27. In a motor-driven lawn mower, a self-impelled vehicle including a vehicle frame and a propelling motor having means for propelling the vehicle at a relatively slow speed suitable for mowing and at a higher transporting speed, and a gang of overlapping mowing units having rotary cutters connected to said frame to be advanced thereby upon and over the lawn to be mowed, in combination with an organization of means on the vehicle corelated with other means on said gang adapted for rendering said cutters non-rotative to permit said gang to be transported at high speed.

28. In a motor-driven gang lawn mower, the combination with a gang of lawn mower units having ground-wheels and cutter mechanisms arranged in overlapping positions and adapted to accommodate ground undulations, of a motor vehicle, a frame section jointed to the vehicle and normally resting on one of said units and maintaining the same in its predetermined overlapping position, means whereby the cutter mechanism of said unit may be held in lifted position to make a high cut of the grass, and means whereby the entire weight of said frame section may be carried by the vehicle.

In testimony whereof, I have signed this specification.

CHARLES C. WORTHINGTON.